US009121742B2

(12) United States Patent
Griessbaum et al.

(10) Patent No.: US 9,121,742 B2
(45) Date of Patent: Sep. 1, 2015

(54) APPARATUS AND METHOD FOR CORRECTING AN OFFSET

(71) Applicant: VEGA Grieshaber KG, Wolfach (DE)

(72) Inventors: Karl Griessbaum, Muehlenbach (DE); Juergen Haas, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 414 days.

(21) Appl. No.: 13/762,127

(22) Filed: Feb. 7, 2013

(65) Prior Publication Data

US 2014/0047896 A1     Feb. 20, 2014

Related U.S. Application Data

(60) Provisional application No. 61/596,507, filed on Feb. 8, 2012.

(30) Foreign Application Priority Data

Feb. 8, 2012 (EP) .................................. 12154564

(51) Int. Cl.

| G01F 25/00 | (2006.01) |
|---|---|
| G01S 7/40 | (2006.01) |
| G01F 23/284 | (2006.01) |
| G01S 13/10 | (2006.01) |
| G01S 13/88 | (2006.01) |

(52) U.S. Cl.
CPC .......... *G01F 25/0061* (2013.01); *G01F 23/284* (2013.01); *G01S 7/4021* (2013.01); *G01S 13/103* (2013.01); *G01S 13/88* (2013.01)

(58) Field of Classification Search
None
See application file for complete search history.

(56) References Cited

U.S. PATENT DOCUMENTS

| 2002/0034123 A1 | 3/2002 | Fuenfgeld |
| 2006/0055593 A1 | 3/2006 | Honda et al. |
| 2007/0018883 A1 | 1/2007 | Hester et al. |

FOREIGN PATENT DOCUMENTS

| DE | 100 44 769 | 4/2002 |
| EP | 1 635 192 | 3/2006 |
| EP | 1 748 303 | 1/2007 |
| EP | 2 327 966 | 6/2011 |

*Primary Examiner* — Robert R Raevis
(74) *Attorney, Agent, or Firm* — Fay Kaplun & Marcin, LLP

(57) ABSTRACT

An offset determination apparatus and a method are for correcting an offset by supplying a switch-off signal outside a predefinable measuring range of time-expanded sampling values of a reflection signal, which switch-off signal can deactivate a transmitter device at least intermittently in order to generate a predefinable quiescent range within the time-expanded sampling values of the reflection signal and in that, by evaluating at least one sampling value of the time-expanded sampling values which is determined within the quiescent range, a value of an amplitude offset of the time-expanded sampling values of the reflection signal from a normal value is determined and is supplied at an output of the offset provision device.

15 Claims, 4 Drawing Sheets

APPARATUS AND METHOD FOR CORRECTING AN OFFSET

CROSS-REFERENCE TO RELATED APPLICATIONS

This application claims the benefit of the filing date of EP Patent Application Serial No. EP 12 154 564.4 filed 8 Feb. 2012 and U.S. Provisional Patent Application Ser. No. 61/596,507 filed 8 Feb. 2012, the disclosures of both applications are hereby incorporated by reference.

TECHNICAL FIELD

The present invention relates to measuring technology, for example the measurement of filling levels in tanks. In particular, the present invention relates to an offset determination apparatus, a measuring apparatus, a method for determining an offset, a computer-readable storage medium and a computer program product.

BACKGROUND OF THE INVENTION

With certain applications of time measurement methods, it can occur that a region of an echo curve which is selected for determining the offset of the echo curve is no longer free from interference, such as free from noise. In this case, the value of the offset is wrongly determined and deviates from the real offset value. A deviation from this actually present offset value can lead to the occurrence of inaccuracies or errors when determining a reference line or a normal value. These inaccuracies may lead in turn to inaccuracies when determining a measured value relating to this reference line.

In document DE 100 44 769 A1, a method is described for measuring distance by means of a signal, wherein an echo signal is received by a receiver device or by a receiving device, said echo signal being superimposed with a first reference pulse and wherein the echo signal is compared with a second reference signal that has a second reference pulse for the determination of a signal transit time.

Often, with measuring methods for the measurement of filling levels, a reference curve which must be determined and stored in advance is used in order to correct a newly read-in curve. An empty tank may be necessary for determining this reference curve, said tank having to be emptied artificially from time to time for adjusting the reference curve.

Accordingly, it may be a motivation for the present invention to enable more efficient measuring of signal transit times.

SUMMARY OF THE PRESENT INVENTION

Consequently, an offset determination apparatus, a measuring apparatus, a method for determining an offset, a machine-readable storage medium and a computer program product may be provided.

According to one aspect of the present invention, a subject-matter may be described in accordance with the independent claims. Further exemplary embodiments of the present invention may emerge as a result of the subject-matter described by the dependent claims.

An offset determination apparatus may also be suitable for correcting an offset.

According to one aspect of the present invention, an offset determination apparatus is described which may have a sampling receiver device or a sampling receiving device, a control device and an offset provision device. The sampling receiver device can be set up to receive time-expanded sampling values of a reflection signal of a transmit signal. In this context, the time-expanded sampling values may also be understood to comprise values of an analog echo curve which have been reconstructed from sampling values of an echo curve. The reflection signal can be made up of a plurality of individual receive signals. The transmit signal can be generated and sent or transmitted or emitted having a first cycle duration or having a first time of oscillation by a transmitter device. The transmitter device or the transmitting device may be a component that is operated externally to the offset determination apparatus. To control this external component, the offset determination apparatus may have an external interface via which signals for and/or from the transmitter device are provided and which may be used to control the transmitter device.

The control device may be set up to control the transmitter device. For this open-loop or closed-loop control or for this control or regulation, the control device may further be set up in such a way that it can determine a predefinable measuring range or known measuring range of the time-expanded sampling values of the reflection signal. Determination of the measuring range can also include identification of the measuring range. The control device may be further set up to provide a switch-off signal outside the measuring range. This switch-off signal can deactivate the transmitter device at least partially in order to generate a predefinable quiescent range or idle range within the time-expanded sampling values of the reflection signal. The measuring range can be either a time domain of an echo curve or a local domain of an echo curve wherein the time domain and the local domain can be transformed into each other. Thus, for example, a range may be a chronological interval or a local interval. Corresponding intervals may be repeated periodically in the case of periodic signals.

The offset provision device may be set up so that, by evaluating at least one sampling value of the time-expanded sampling values, which value has been determined within the quiescent range or outside the measuring range, it can determine a value of an offset, in particular the value of an amplitude offset, or a deviation of the time-expanded sampling values of the reflection signal from a normal value, from a zero value, from a base value or, for example, from a zero amplitude value. The normal value may in one example be an expected amplitude value, an expectation value, a set point or a desired value of the receiver output signal with essentially complete absence of any receive signal caused by the transmit signal, which may mean in a signal-free space. In a different example, the normal value may be an expected amplitude value or an expectation amplitude value. Thus the normal value may be a value that is essentially only to be expected in theory, which value takes no account of receive signals that are caused by transmitter sources which are present under normal conditions. Receive signals from interference in a transmit-receive device itself and thus interference which essentially cannot be switched off or screened or shielded is not included in such a theoretical value.

The offset determination apparatus can supply the offset that was determined from the deviation from the normal value at an output of the offset provision device which it contains. The signal supplied at this output of the offset provision device which essentially has the offset itself or a correction value can be transferred via the output to an actuating element, for example, and/or to a digital potentiometer of an offset control device. For example, an output of the offset provision device can be connected to a digital potentiometer and form an offset control loop. A different output of the offset provision device may additionally or alternatively be connected to a digital signal processing device.

According to a further aspect of the present invention, a measuring apparatus, a measuring system, a measuring arrangement or a measuring set-up is described which may comprise a transmit-receive device and the offset determination apparatus according to the invention. In this measuring apparatus, the control device of the offset determination apparatus may be connected to the transmitter device such that, for example, it is possible to act on the transmitter device from the offset determination apparatus. In one example, the transmitter device may form a sensor in combination with a plurality of other components. In particular, a sensor can comprise a transmitter device. A measuring apparatus can contain at least one transmitter device and one offset determination apparatus. The offset determination apparatus, however, can also be operated as an external device to the measuring apparatus.

According to yet another aspect of the present invention, a method for determining an offset or an amplitude offset may be described. This offset which may be determined using the method can be a deviation of a sampling value or sampling amplitude from a normal value.

The method may comprise receiving time-expanded sampling values of a reflection signal of a transmit signal, wherein the transmit signal and therefore also the reflection signal or receive signal are transmitted or received with a first cycle duration by a transmit-receive device. It may be further provided in the method that a switch-off signal which can deactivate the emission of the transmit signal at least intermittently or temporarily can be provided outside a predefinably specified measuring range of the time-expanded sampling values of the reflection signal. A predefinable quiescent range within the time-expanded sampling values of the reflection signal may be generated by deactivating the emission of the transmit signal. Together with the sampling values of the measuring range, this quiescent range may result in a compound reflection signal whose cycle duration comprises the echo signal and the quiescent signal. The measuring range and the quiescent range may have virtual boundaries at which they are strung together such that the measuring range and the quiescent range alternate periodically along a time axis or a local axis of an echo curve. The boundaries may lie at points which correspond to an even multiple of the first cycle duration. However, they may also lie at any other points. In one example, the cycle duration with which the measuring range and the quiescent range alternate may correspond to a frequency of the switch-off signal.

The method for determining an offset value may additionally comprise the determination of a value for the offset of the time-expanded sampling values of the reflection signal from a normal value. At least one sampling value which lies within the quiescent range generated by the offset determination apparatus may be ascertained for determining the offset. A boundary condition which ought really to lead to the normal value may be applied. The deviation of the measured echo curve from the echo curve to be expected can be determined by actually determining the reflection value while the conditions of the boundary condition prevail.

In addition, it may be envisaged to supply the value of the determined offset as an output of the method.

According to a further aspect of the present invention, a machine-readable storage medium may be specified which has a program code that, when it is executed by a processor, performs the method for determining an offset.

According to yet another aspect of the present invention, a computer program product may be specified which, when it is executed on a processor, can instruct the processor to perform the method for determining the offset.

An offset determination apparatus may be able to receive reflection signals or receive signals which are provided in any form. The reflection signal may originally have been generated by a transmitter device which transmits a transmit signal. For example, the transmitter device may be a sender or a transmitter which transmits a pulse signal with a predefinable first cycle duration. The pulse signal can be a burst with a fixed or variable burst frequency and a repeat frequency with a predefinable first cycle duration. In a different example, the pulse signal can be a monopulse having a repeat frequency with a predefinable first cycle duration. The offset determination apparatus can receive the receive signal by means of a receiver device, for example an antenna. The receiver device can be part of a transmit-receive device. The receiver device can also comprise the sampling receiver device. It may be possible to analyse the reflection signal received by the receiver device in respect of individual reflectors by means of a downstream evaluation or evaluation device which can be realised, for example, by electronics or by an electronic system.

As the transmit signal is sent with a first cycle duration, the reflection signal may essentially have the same first cycle duration. The time-expanded sampling values may be generated by signal conditioning of the reflection signal from a plurality of periodically repeated receive signals. The number of periodic signals which is used for generating the time-expanded sampling values of the reflection signal may determine a time expansion factor which may lead to a prolonged representation or to an expanded representation of the reflection signal.

The time-expanded sampling values may occur as a result of sequential sampling of a periodic signal with a second cycle duration. For example, the receive signal may be such a periodic signal that is sampled. Essentially, sequential sampling may not be used for digitisation but rather for time expansion. Thus in one example, a time-expanded echo curve can be generated from the sampling values.

The time-expanded echo curve of the reflection signals essentially has the progression or the shape of the periodically repeated, actually received echo curve. However, an enlargement of the time domain can be achieved by means of time expansion, the result of which is that a different scaling of the relationship between the time and the distance becomes possible. The time-expanded reflection signal can be provided as an analog curve. After digitisation, however, a progression of discrete values of this time-expanded analog reflection curve can also be generated, as a result of which, for example, digital signal processing of the time-expanded sampling values of the reflection signal may be enabled. The time-expanded analog curve can be sampled with a third cycle duration. This sampling can lead to essentially the same or shifted interpolation points, sampling points, supporting points or nodes from which the analog time-expanded curve was generated. By using a signal with a third cycle duration, more precisely or more roughly resolved interpolation points may occur than with the second cycle duration.

In another example, the step of reconstructing an analog echo curve can be skipped and the interpolation points already present due to the sequential sampling, and which are spaced apart by the second cycle duration, can be used as starting values for the digitisation.

In yet another example, the third cycle duration can have the same value as the second cycle duration.

The time-expanded sampling values of the reflection signal may represent interpolation points of a waveform or of a curve progression, which values essentially reflect the discrete behaviour of the reflection signal and the interpolation points may have a time interval of a sampling signal. This time interval or time distance may, for example, be a second cycle duration. The second cycle duration may be greater than the first cycle duration, which means that a correspondingly high number of repetitions of the sampling operations or sampling actions maps the periodically repeated received curve in an extended time scale. The smaller the time difference between the cycle durations, the finer the time and/or local resolution of the time-expanded sampled echo curve may be, or the closer the interpolation points may be next to each other. As the transmit signal is essentially generated periodically, a periodically running reflection signal or a periodically proceeding reflection signal may be generated.

In order to now enable offset determination, the described offset determination apparatus may provide for generating a signal which makes it possible to switch off or to deactivate the transmitter for a predefinable time. Switching off or deactivating the transmitter or the transmitter device may switch off the transmit signal whereby the transmit signal represents the cause of the reflections. Switching off the source of the signal causes existing reflections to die away and after a certain waiting period or after a certain waiting time there are essentially no more reflections or reflection signals which could be received. If the offset determination apparatus is used in a level measuring instrument, then switching off the transmitter device may lead to the interior of a tank being essentially anechoic or free of reflections. Thus, by switching off the transmit signal, the offset determination apparatus may generate a predefinable or defined quiescent range in the time-expanded analog reflection curve and thus also in a corresponding sampled time-expanded echo curve. In the actually received reflection curve, the switch-off may make an appearance in such a way that the periodic signal of the reflections may be interrupted for the switch-off time. In other words, the measured reflection signal may adjust to the actually measured reflection signal (steady state) which corresponds to the quiescent value in the actual measuring environment. In yet other words the measured reflection signal may make transient oscillations to reach the actually measured reflection or the steady state. This adjusted actual reflection signal or the actually reflection signal in the steady state, which is present after switching off the transmit signal, may be shifted by the offset from the expected normal value or from the desired normal value despite switching off the transmit signal. In other words, the amplitude values of the reflection signal may be shifted constantly or linearly by the offset value. Therefore on switching off a transmitter device, one may expect a specific received value, a normal value or a desired value. It may be, however, that this expected normal value cannot be determined in the actual environment despite the presence of the boundary conditions which ought to lead to such a normal value, because interference may possibly cause the actually measured reflection signal to deviate from the expected normal value. However, if one assumes essentially constant superpositions of this interference on receive signals, one can also assume that the reflection signals actually received while the transmitter device is switched on also deviate from the interference-free reflection signals to be expected.

In connection with the reflection signals generated and in particular with the reflection curves or echo curves generated from them, "periodic" may mean that regular echo curves are generated from the periodically transmitted transmit signals. The transmit signals sent periodically can in turn have a certain periodicity. The shape or progression of the echo curves may essentially depend on the physical conditions of the signal propagation path and on the distance of a reflector from the transmitter device. In other words, this may mean, for example, that when using an offset determination apparatus for level measurement in a tank or in a container, the shape or progression of the periodic echo curve may depend on objects or installed components in the tank and on the fill level of filling goods. For example, such installed components can be agitators or ladders that are installed in a tank. Reflections of objects are noticeable as elevations of the amplitude of the echo curve or of the reflection signal plotted over time. The filling goods may in this connection mean the matter or the material for which the filling level is to be determined in a tank. It can be a fluid, that is to say a gas or a liquid, a solid or also a bulk solid.

The term "periodic signal" may mean that a measuring range is acquired from the reflection signal at periodic intervals, in which measuring range a reflection curve generated inside a filling goods tank is evaluated, and a quiescent range occurs which was generated by having switched off the transmitter device and recording the signal despite the transmitter being switched off. Thus a boundary may emerge between a region of the echo curve in which reflection signals are expected and should be evaluated and a region in which the quiescent behaviour of a measuring apparatus should be determined by means of the offset determination apparatus.

During the quiescent phase, that is the phase during which the transmit signal is blocked or is not generated, the influences which are generated by the reflections of a sent signal should essentially be discarded in order to determine the effect, the influence or the impact of the receiver on the receive signal. A curve of time-expanded sampling values of the reflection signal may have a plurality of interpolation points. This plurality of interpolation points may be considered as a set, a group or a quantity of interpolation points. In this set of interpolation points, the quiescent range can be defined as a subgroup or a subset of contiguous interpolation points that lie outside the range in which reflection signals are normally present. The subgroup of interpolation points which fall within the measuring range should form a different disjunctive subgroup of interpolation points.

A measured echo curve or resulting echo curve can be made up of the superposition of the influences from reflections, that is to say of the expected echo curve, and the interfering influences. If the interfering influences are known, in particular the interfering influences of a receiver, then the interference-corrected echo curve or essentially the expected echo curve can be determined from the measured echo curve. Since a sampling receiver device of the offset determination apparatus may also be active during the quiescent times, the influences of the receiver device which contribute to a deviation of the echo curve from a specified desired quiescent value, normal value or a zero amplitude during the measuring phase can be determined without the influence of the reflections. Due to the influence of the interference signals or noise signals from the receiver, the actually determined echo curve can be shifted in relation to the expected echo curve. The quiescent range may also be referred to as a quiescent time or quiescent phase.

An offset, in particular an amplitude offset, may be an essentially constant or fixed value over a time interval or over a space interval which shifts all the amplitudes of a receive signal linearly from a quiescent value, as a result of which an error or a deviation of the acquired reflection curve or echo curve from the echo curve to be expected is generated. The echo curve to be expected would be measured if the receive signal was free from interference. This ideal echo curve should be approximated by the offset elimination. Since the amplitude values of a reflection signal can often be represented in a Cartesian coordinate system with the abscissa, with the x-axis or with the x-coordinate as the time axis or local axis, the offset may essentially signify a constant shift along the ordinate. Thus it may be possible with the offset determination apparatus to determine this offset or the offset value and to generate a correction signal. This correction signal can be provided and used to approximate the measured echo curve to the interference-free echo curve to be expected. This may make accurate measurement easier.

According to an exemplary embodiment of the present invention, the time interval or a timely distance of the time-expanded sampling values of the reflection signal is a second cycle duration or a third cycle duration where the second cycle duration or the third cycle duration may be greater than the first cycle duration. The choice of the time intervals with which a received echo curve is sampled can lead to the periodically generated echo curve being retraced by interpolation points or sampling values. Retracing of the echo curve can generate a time-expanded representation of the echo curve. The nearer the second cycle duration is to the first cycle duration, that is to say the smaller the difference between the two cycle durations, the more detailed the echo curve may be retraced in the time-expanded region or in the time-expanded domain; however, the more cycle durations it may require until a complete echo curve is traced.

According to a further exemplary embodiment of the present invention, the duration of the switch-off signal or of the deactivation signal may correspond to an integer multiple of the first cycle duration or period.

The duration of the switch-off signal may describe a time domain, a time range or an interval during which a transmitter device may not generate a transmit signal or may generate no signal. This may result in receiving quiescent values. Quiescent values may be generated on condition that essentially no reflections are present so that essentially the receiver device or the receiver may receive only the interference of the environment during the quiescent phase. Environmental influences may, for example, be receiver noise or environmental noise. The duration of the switch-off signal may determine the duration of a quiescent interval on the time axis. This duration of the quiescent interval or the quiescent duration can be transformed into a local range, the quiescent range. Values that are received during the application of a switch-off signal at a sampling receiver device may thus lie within the quiescent range or within the quiescent duration. Due to the limited duration, the quiescent range defines an interval or a section of a timescale, in particular a section of a local scale. As a result of this division of the scale, the quiescent interval can be construed as a section of the relevant scale which is surrounded by other ranges which can be construed as outer ranges outside the quiescent interval. The outer ranges may include the quiescent interval. Received values which are received when a transmitter device is active, that is a transmitter device which is not switched off, may lie in these outer ranges outside the quiescent range. Received values which are received when a transmitter device is deactivated, that is when a transmitter device is switched off, may lie within the quiescent range.

The term "domain" or "range" may be used to describe a time domain and also a local domain where essentially both domains may be converted into each other by including a signal propagation speed, essentially light speed, and a time expansion factor.

The range outside the quiescent range may be essentially the measuring range. The measuring range may describe the range that may be of interest for measurement of the reflection signal. The length of the measuring range can be specified in accordance with the equipment implementation or as a function of the equipment design, for example of a sensor length, a probe length and/or of the application in which the measuring apparatus will be used. The height of the tank or the relative permittivity ($\epsilon_r$) of the filling goods can play a role in the application. Furthermore, the length of the measuring range can be affected by a planned safety range. The safety range may be a range within the measuring range that is provided to ensure that all tank-relevant reflections are also really acquired. In one example, the measuring range may correspond to an actual tank length, i.e. to the time domain of an echo curve transformed into a local domain in which echo signals may essentially be expected for a specified or predefined tank height or tank length. The time-expanded reflection signal may thus retrace a change between measuring range and quiescent range wherein the interface or transition between both ranges may be referred to as a boundary or range boundary.

Thus starting from a measuring range, a quiescent range may be located after a measuring range when considered in a time domain. The quiescent range may be further away from a transmitter device along a local axis. It may be provided that offset determination is not started immediately at the range boundary but rather that initially there may be a wait for a determinable time or a safety interval before the offset value is determined. However, because of the sequential sampling, the safety interval may turn out to be significantly shorter than if the non-time-expanded signal had been used.

The safety interval may be chosen as to be very short. In one example, a quiescent range of 1 m or of a correspondingly transformed time period may be the result of choosing the short length of the safety interval or safety range regardless of the length of the measuring range. It may be considered as an aspect of the invention to create an offset determination apparatus which generates a switch-off signal that leads to or result in a length of a quiescent range for offset determination of 1 m or less than 1 m. The length of the measuring range may be variably adjustable. In a different example, the length of the quiescent range may be 1 in or 2 m or any other value between 1 m and 2 m.

Consequently, no quiescent range which depends on the measuring range must be adhered or followed to since the quiescent level may essentially ensue immediately if the transmitter is deactivated. The length of the measuring range and the quiescent range may be specified independently of each other. A certain period for the reflections to decay can arise because the non-time-expanded reflection signals typically have to decay or to fade over a plurality of the first cycle durations. The time-expanded reflection signals generated by sampling accordingly require the same time to decay where, due to the time expansion, this decay time is negligible small or extremely small in relation to the time in which the quiescent level or the time in which the measuring range is present. For example, the decay time is a few microseconds while the time for the measuring range or the quiescent range may range between 1 and 100 milliseconds due to the time expansion.

According to a further exemplary embodiment of the present invention, the predefinable measuring range may depend on a tank height.

To be able to take a variable tank height into account, the offset determination apparatus may provide a setting device with which a user can specify and adjust the tank height. The measuring range of interest, which can vary according to application case but which may essentially correspond to the tank height or to a corresponding comparative value, can also be specified via this setting device. The control device can comprise this setting device.

According to yet another exemplary embodiment of the present invention, the offset determination apparatus and in particular its offset provision device may be set up in such a way as to calculate the value of the offset of the time-expanded sampling values of the reflection signal from the normal value by averaging a plurality of sampling values determined from within the quiescent range in the offset provision device. There is an offset of the time expanded sampling values from the normal values.

Within the quiescent range, it may be assumed with a high degree of probability that all the influences of previously generated reflections of a measuring range have decayed to such an extent that they may no longer have any effect on determination of the offset. It may be possible to implement accurate offset determination by this choice of the point in time, of the time or location of offset determination within the quiescent range. The quiescent range can be generated at any location within the periodic reflection curves or echo curves also with any length of interval by deactivating the transmitter device within this interval. According to a further aspect of the invention, the quiescent range is selected directly following the end of the measuring range.

According to yet another exemplary embodiment of the present invention, the offset determination apparatus can have a selector device that is set up such that it supplies a time-expanded sampling value, which occurs within the measuring range, at a first output of the selector device. And in addition, the selector device may be set up such that it supplies the at least one sampling value, which is determined within the quiescent range and therefore lies outside the measuring range, via a second output of the selector device to the offset provision device.

With such a selector device it may be possible, depending on a switching state, to forward received values of the reflection signal to different signal processing device of the offset determination apparatus.

For example, reflection values or sampling values which are determined within the measuring range can be forwarded in a first switching state to an offset correction device via which the received signal values can be provided directly as an actually determined measured value. The received signal values can also be freed from the offset in the offset correction device and provided as a corrected echo curve after an offset correction. When supplying the corrected echo curve, the offset determination apparatus can provide to determine whether an offset correction is necessary and, if it is necessary, to include the offset value. If no such offset correction is necessary, the received echo curve can be provided directly. As a result of the determination from a time or distance between a reference signal or transmit signal and the position of the reflection of the filling goods surface determined from the reflection signal, a measured value which is representative for a distance or a filling level can be provided from the corrected echo curve.

The selector device can, after switching over to a second switching state, forward the values received during a quiescent range or within a quiescent range to the offset provision device. The offset provision device can determine the current offset value from the values within the quiescent range and can make this current offset value available, for example, to the offset correction device. In the second switching state, an average offset value can be determined by means of averaging over a longer period of time to increase accuracy.

The selector device may thus enable sorting of the reflection signals. The sampling values of the reflection signal which occur within the measuring range are forwarded to the offset correction device as a result of the first switching state. The sampling values which have been received within the quiescent range can be forwarded to the offset determination device. The total set of the sampling values of the reflection signal within a cycle duration can thus be divided into the sampling value subset of the quiescent range and the sampling value subset of the measuring range. In particular, the selector device can, by means of the switchover, ensure the specification of the range boundaries between the measuring range and the quiescent range. For this specification of the range boundaries, the selector device may essentially be coupled to the control device which may also generate the switch-off signal for the transmitter device.

According to yet another exemplary embodiment of the present invention, the offset provision device may be set up to use the determined value of the offset or of the deviation of the time-expanded sampling values of the reflection signal from a normal value for offset correction of the reflection signal prior to sampling or prior to digitisation of the reflection signal. Alternatively or supplementary thereto, the offset provision device can be set up to use the determined value of the offset for an offset correction of the reflection signal after digitisation of the reflection signal. To differentiate from sampling for the purposes of time expansion, sampling of the reflection signal for the purposes of digitisation can be referred to as A/D (analog/digital) conversion or digitisation. A sampling signal having the third cycle duration can be used for digitisation. The third cycle duration for digitisation can be equal to the second cycle duration of the sampling for time expansion or can be different therefrom.

Prior to digitisation of the reflection signal, the time-expanded reflection signal may be present as an essentially analog reflection signal or as an analog echo curve.

After digitisation, for example by means of an analog/digital converter (A/D converter), discrete values of the analog time-expanded echo curve may describe a discrete time-expanded echo curve. Unlike the analog values, the discrete values of the discrete echo curve can be corrected by calculations by means of a digital signal processing device. For example, a microprocessor and methods of digital signal processing can be used for this calculation.

An offset correction on the analog side, that is to say prior to digitisation of the echo curve, may be possible with hardware equipment such as for example an analog actuating element or a digital potentiometer. An analog correction can also be combined with a digital correction in order to have a greater influence on the reflection signal to be corrected.

According to yet another exemplary embodiment of the present invention, the offset determination apparatus may comprise an offset correction device, wherein the offset correction device is set up to correct the time-expanded sampling values of the reflection signal in order to provide an interference-corrected reflection curve or an interference-corrected echo curve which is corrected by the value of the offset. The ideal interference-free echo curve may be approximated by correcting or cleaning the interference in the echo curve. In this context "correcting" may also mean "purging" or "cleaning".

According to yet another exemplary embodiment of the present invention, the offset determination apparatus may comprise a deactivation device. The deactivation device may, for example, enable a user to transmit the switch-off signal at any point in time, for example even within the measuring range. The deactivation device can thus overwrite the control device.

In other words, the deactivation device may render it possible to be able to perform an offset measurement immediately, regardless of whether the end of the measuring range within the echo curve has already been reached.

According to yet another exemplary embodiment of the present invention, the time-expanded sampling values of the reflection signal may be generated by sequential sampling and/or by digitising. Sequential sampling may correspond to performing a cross-correlation.

Generation of the time-expanded sampling values may essentially take place in two stages. In a first stage, a time-expanded analog reflection signal or a time-expanded analog echo signal may be generated from a periodic analog reflection curve by means of cross-correlation or sequential sampling. This time-expanded analog echo signal may then be discretised or digitised in a second stage using an A/D converter. As a result, the time-expanded sampling values of the reflection signal are then available. The offset determination apparatus may in one example have a device for generating the time-expanded sampling values according to this two-stage process. However, the time-expanded sampling values can also be provided by an external transmitter device.

According to yet another exemplary embodiment of the present invention, the measuring apparatus may be a measuring apparatus which is selected from the group which consists of a level measuring instrument, a limit level measuring instrument, a time domain reflectometer, a reflection measuring instrument and a measuring instrument based on the guided microwave principle.

A computer-readable storage medium may be a floppy disk, a hard disk, a USB (universal serial bus) storage medium, a RAM (random access memory), a ROM (read only memory) and an EPROM (erasable programmable read only memory). A communications network such as the Internet can also be regarded as a computer-readable storage medium which may enable uploading or downloading of program codes.

Therefore the present invention deals with an apparatus which implements the idea of transforming a periodically received echo curve into a time-expanded range and of generating a quiescent range. As a result of the time expansion, a suitable range may be available in which a transmitter can be switched off and in which it can be expected that reflection signals have decayed very quickly in order to determine an offset value with an active receiver or with an active receiver apparatus or with an active receiver device. This offset value may be suitable for shifting the received interference-afflicted echo curve such that it approximates a desired echo curve. This desired echo curve would emerge if the reflection signals had been received with an essentially interference-free or ideal receiver device. When determining the desired echo curve or the interference-corrected echo curve, the shift of a received quiescent value from a desired quiescent value, from an expected ideal value or from a normal value may be taken into consideration. In other words, the deviation of the actually measured quiescent reflection curve from the desired quiescent curve to be expected can be measured during the quiescent range. The desired quiescent curve may be a curve whose shape, progression or characteristic is known in advance. For example, the shape is known for a zero amplitude curve which can be considered as a desired quiescent curve and reflects the expected echo shape as it appears in the absence of any reflection signal or receive signal or with a switched off transmitter. An echo curve which contains reflections may not be suitable as a desired quiescent curve. Therefore a reflection curve of an empty tank should not be used as a reference curve or desired quiescent curve. The desired quiescent curve should rather have an essentially constant shape under known boundary conditions such that it can essentially be assumed that, after setting the boundary condition, the expected shape would result and any deviation from the expected shape will represent an interference.

It should be noted that different aspects of the invention have been described with reference to different subject-matters. In particular, some aspects have been described with reference to apparatus claims, while other aspects have been described with reference to method claims. An expert, however, can gather from the previous description and the following description that, unless it is described otherwise, in addition to any combination of features which belongs to one category of subject-matters, any combination between features which refers to different categories of subject-matters will be considered as disclosed by this text. In particular, combinations between features of device claims and features of method claims should be disclosed.

BRIEF DESCRIPTION OF THE FIGURES

Further exemplary embodiments of the present invention will be described in the following with reference to the figures.

DETAILED DESCRIPTION OF EMBODIMENTS

Figures 1, 1A:
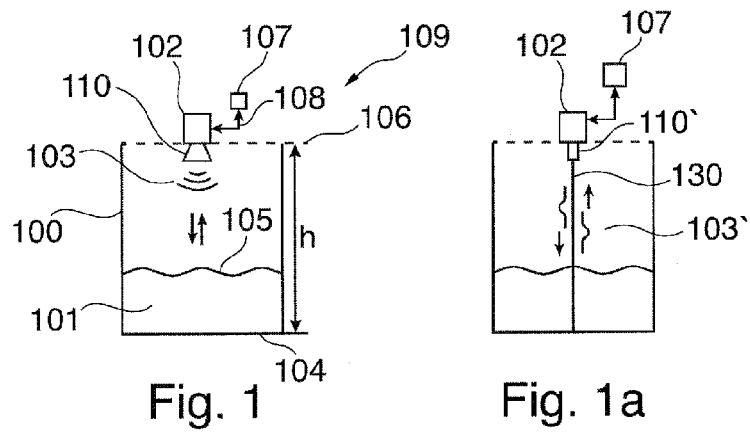
FIG. 1 shows a measuring arrangement or a measuring setup for level measurement with free field propagation of a transmit signal according to an exemplary embodiment of the present invention.
FIG. 1a shows a measuring arrangement or a measuring setup for level measurement with a transmit signal, which is propagated according to the guided microwave principle, according to an exemplary embodiment of the present invention.

The illustrations in the figures are schematic and not to scale. In the following description of FIG. 1 to FIG. 9, the same reference numerals are used for identical elements or elements corresponding to each other.

FIG. 1 shows a measuring arrangement 109 or a measuring setup 109 for level measurement according to an exemplary embodiment of the present invention. For the level measurement, the level of the filling goods 101 should be determined as accurately as possible in a tank 100. In this case, tank 100 has a height h which is measured essentially parallel to the direction of signal propagation. Installed components (not shown in FIG. 1) which may influence reflection behaviour can be present in the tank. To determine height h, a transmit signal 103 is generated by a transmit-receive device 102 or a sensor 102, said signal being transmitted in the direction of a tank bottom 104 opposite to the transmit-receive device 102 and is reflected either on tank bottom 104 or, in the presence of filling goods 101, on filling goods surface 105. The reflected signal is received by transmit-receive device 102, which can have a transmit and receive separator 305 and/or a transmitter 302, and processed further. Switching off of the transmitter should be understood to mean that transmitter part 302 of transmit-receive device 102 is switched off. It should still be possible to receive a signal with the receiver part of transmit-receive device 102. During further processing, a distance of the reflector, for example the distance of filling goods surface 105 or tank bottom 104, from a reference line 106 of transmit-receive device 102, is determined from the determined transit times of the transmitted signal and the reflected signal in measuring device 109. The reference line may be determined by the installation location of transmit-receive device 102 and in particular by the installation location of antenna 110.

On receiving the reflection signals, however, it is possible due to environmental influences for interference to occur in the form of an offset which is responsible for a reflection signal to which an error value is added or applied. Due to the offset, the measured reflection signal does not correspond to the expected reflection signal but rather to a reflection signal shifted essentially by the constant offset value. This shift, deviation or offset from a reference value is to be compensated using offset determination apparatus 107. The reference value may, for example, be a zero amplitude but also the echo curve to be expected. For compensating the offset, offset determination apparatus 107 determines the offset value and takes care of the offset correction. The offset correction can have the effect that essentially a reflection signal is defined that is close to the expected desired reflection signal. Transmit-receive device 102 is connected to offset determination apparatus 107 via an interface 108 and together they form measuring system 109 or measuring apparatus 109. The connection between offset determination apparatus 107 and transmit-receive device 102 is made, for example, via a field bus interface, via an I²C (inter-integrated circuit), via an SPI (serial peripheral interface) or via another serial or parallel interface.

Even if in FIG. 1, offset determination apparatus 107 is represented as an external apparatus to transmit-receive device 102, offset determination apparatus 107 can also be integrated in transmit-receive device 102. By providing a standard interface 108, offset determination apparatus 107 can also be retrofitted in existing transmit-receive devices 102 or sensors 102 to also enable offset correction in transmitter device already installed.

An offset generally represents a value of a shift for a curve or characteristic curve of a desired value. In the present case of offset correction of an echo curve or reflection signal, an offset is intended to describe an amplitude deviation or a difference between an echo curve that is essentially determined without interferences and an echo curve that is determined taking interferences into account. An offset shift of the echo curve or of the reflection signal can also arise due to physical influences, such as temperature fluctuations, for example, the absolute temperature, due to electromagnetic disturbances, due to the setup of receiving electronics and due to corresponding noise influences. These influences can have an effect on both the transmission path for the signal and also on the receiving electronics.

FIG. 1a shows a measuring arrangement which uses the guided microwave principle for filling level measurement. The setup of this measuring arrangement essentially corresponds to the setup of measuring arrangement 109 from FIG. 1. Coupling device 110', coupling-in device 110' or injection device 110' which is set up to couple transmit signal 103' into guide 130 is used instead of antenna 110. Guide 130 may be configured as a bar probe, as a metal rope, as a rod, as a waveguide or as a coaxial cable. Signal 103' propagates along guide 130 instead of in the free field. The description for the measuring setup with the free field propagation from FIG. 1 applies correspondingly for the measuring setup from FIG. 1a which uses the guided microwave principle, even if only free field propagation is discussed in the description.

The offset generated by the interferences should be compensated or corrected since it can lead to a restriction of the system sensitivity. The system sensitivity is specified by the smallest echo still to be detected. In this case, an echo refers to a deflection of a received amplitude of the echo curve from a specified reference value or normal value in the direction of the ordinate of a coordinate system in which the echo curve is represented. The reference value is, for example, a zero amplitude and can coincide with abscissa 403 of the coordinate system. The normal value may be defined as that amplitude value which would be reached or adjusted if all or any interferences were not present and if the receiver was not receiving any receive signals.

Since the offset can lead to a deviation from the normal value and the offset, for example because of chronologically changeable variables, as the temperature fluctuation itself can be time-dependent, an offset which is too large could be identified as an echo and, in one case where no echo is present, could also lead to the detection of an echo and thus to an erroneous output of measuring device 109.

As the system sensitivity is specified by the smallest echo still to be detected, an offset in an echo signal can lead to a misinterpretation as a detection curve is often laid over the echo curve for the purpose of echo detection. The detection curve can be generated in many different ways, e.g. as one or a plurality of straight lines that run parallel to the x-coordinate, as other rising or falling straight lines, as single or multiply curved functions or can be generated from an echo curve stored at some point. The stored echo curve may be determined, for example, by measuring an echo curve in an empty tank, where filter methods, such as a high-pass, low-pass or band-pass filter, can be applied to an echo curve to create the stored echo curve.

The detection curve can also be a highly abstracted echo curve which serves as a threshold value curve for detection of the echoes. The closer this curve can be placed to the desired echo curve, that is to say the better an echo curve with low offset can be determined, the smaller the echoes that can still be detected.

The closer this detection curve lies to the quiescent value of the echo curve, the more echoes can be detected and the more sensitive the system becomes to the detection of echoes. When choosing the detection curve, one attempts to maintain the smallest distance possible between the expected echo curve and the detection curve. The distance between the curves is the detection threshold. The lower this is chosen, the smaller the echoes that can still be recorded or registered. The detection threshold can, for example, have a value of 5 mV. In one case, where essentially no interference at all is present, the detection curve might even be consistent with the normal value curve or even with a zero line and might be a straight line. This means that every deviation that is identified from the zero line in an echo curve can be interpreted as an echo. Often, however, the detection curve is essentially a line parallel to the normal value curve or zero amplitude since essentially there can always be certain shifts. Thus, echoes are not detected until they have a height or signal amplitude which lies above the detection curve. Since positive and negative deflections can occur with an echo curve, where necessary two detection curves, one above and one below the normal value curve, are used and these curves essentially describe a tolerance range around the normal value line. The detection curve can be divided into various areas having different detection thresholds. For example, a higher threshold can be set in the short range than in the long range. The short range may be located up to 0.5 m away from reference line 106. The distance between the detection curve and the interference-free echo curve is specified by an offset to be expected on the echo curve determined. The smaller the offset turns out to be, the smaller the distance between the interference-free echo curve and the detection curve. The smaller the distance, that is to say the lower the offset to be expected because, for example, it will be corrected, the higher the sensitivity of the overall system.

Figure 2:
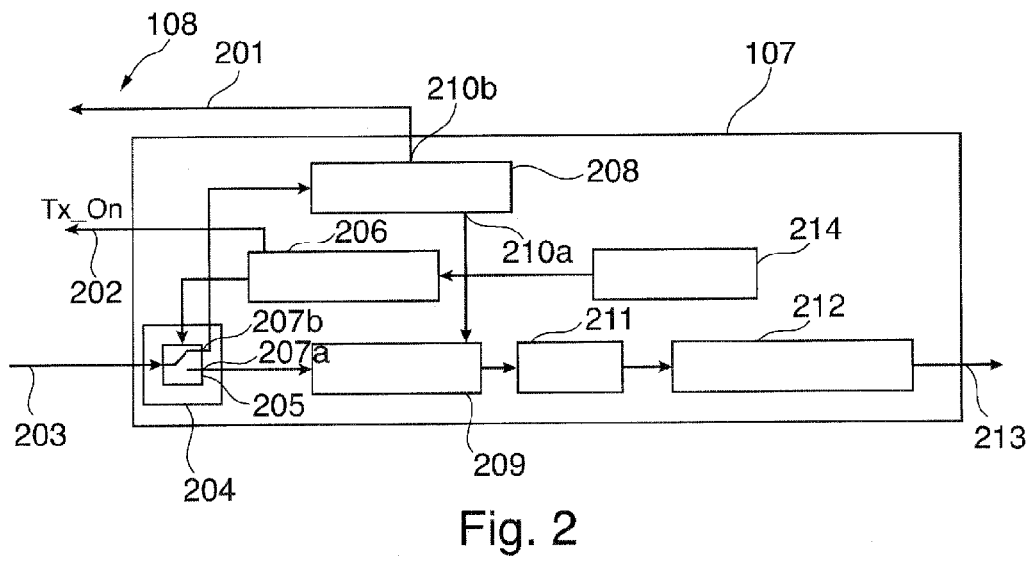
FIG. 2 shows a block diagram of the offset determination apparatus according to an exemplary embodiment of the present invention.

FIG. 2 shows a block diagram of offset determination apparatus 107 according to an exemplary embodiment of the present invention. Offset determination apparatus 107 has an external interface 108 which can be connected or is connected to a transmit-receive device 102 (not illustrated in FIG. 2). Interface 108 comprises, for example, three leads 201, 202, 203 which provide a connection facility to transmit-receive device 102. Interface 108 shows a first connection 201 via which a correction value for compensating an offset value determined by offset determination apparatus 107 can be supplied to an actuating element. This actuating element can, for example, be a digital potentiometer which can be used for offset control or offset correction of an analog echo curve B. Interface 108 also comprises a second connection 202 via which a control signal with the name Tx_On can be exchanged with a transmit-receive device 102, which signal can be used depending on its definition for switching transmitter 302 on and/or off. Thus, the switch-off signal for generating the quiescent range can be supplied to transmit-receive device 102 via this interface 202.

Interface 108 also comprises a third connection which is set up as an input. Input 203 is connected to sampling receiver device 204. Via sampling receiver device 204, both the echo curve, that is, for example, the time-expanded sampling values of the reflection signal, and also the offset curve can be received or read by offset determination apparatus 107.

Connections 201, 202, 203 of interface 108 can be realised as separate leads or as virtual channels with the help of a bus protocol. Sampling receiver device 204 can have selector device 205 which is driven by control device 206, sampling control device 206 or sampling controller 206. Selector device 205 has first output 207a and second output 207b. In a first switching state, selector device 205 can supply, via first output 207a, sampling values of the echo curve which lie within the measuring range. In a second switching state, selector device 205 can make available, via second output 207b, sampling values of the echo curve which lie within the quiescent range.

The sampled entire echo curve or entire reflection curve has two ranges. On the one hand, the entire reflection curve has the measuring range which contains the measured reflection values with existing reflection signal. On the other hand, the entire reflection curve has the offset range, quiescent range or a range described as the offset curve which may describe the part of the entire reflection curve which is recorded while transmit-receive device 102 and in particular a transmitter part of transmit-receive device 102 is switched off. The changeover between the switching states may be synchronised with the range boundaries between the measuring range and the quiescent range.

The offset curve can be passed on to offset provision device 208 via second output 207b. The echo curve or measuring range can be passed on to offset correction device 209 via first output 207a. Selector device 205 thus allows for segmentation of all the reflection signals into the echo curve and the offset curve and the different ranges to be passed on to different signal processing device. The echo curve comprises the subset of the sampling values present within the measuring range. The offset curve comprises the subset of the sampling values present within the quiescent range. Thus it is possible with selector device 205 to ensure that essentially only those sampling values which have been recorded or received in an area or a time interval during which the transmitter was switched off are made available to offset provision device 208. Segmentation device 205, the separation device 205 or selector device 205 can further ensure that essentially only those sampling values which were determined while the transmitter device was also active and while echoes and reflection signals are therefore to be expected inside the tank are supplied to offset correction device 209.

Offset provision device 208 can also be described as offset determination device 208. Offset provision device 208 can determine the offset value based on the deviations of the received offset curve from a normal value or based on the deviations of the sampling values of the quiescent range from a normal value. In particular, offset provision device 208 can supply an offset value for a digital or computational offset correction and also an offset value for an analog offset correction.

A signal for analog offset correction can be supplied via second output 210b of offset provision device 208 via connection 201 of interface 108 to an actuating element of the transmitter device (not illustrated in FIG. 2) on the analog side. Second output 210b therefore supplies a signal for offset correction prior to digitisation with the A/D converter or on the analog side.

A digital offset value can be determined for a digital offset correction. The digital offset value can be supplied via first output 210a of offset provision device 208 to offset correction device 209. Offset correction device 209 can use the digital offset value in order to correct the received echo curve, i.e. the sampling values of the reflection signal within the measuring range, that is to say with the transmitter active, by the value of the offset and pass it on to averaging device 211. The signal at first output 210a is used for digital offset correction, for example by a processor. Averaging device 211 determines an average value of the echo curve corrected by the offset as an ensemble average value, i.e. an average echo curve may be determined over a plurality of measurements. To determine the ensemble average value, sampling values of the past echo curves are averaged with sampling values of the current echo curve at the same place in each case. This average echo curve is passed on to final processing device 212 and final processing device 212 then calculates from the determined echo values a distance value for the filling goods surface and from this a measured value, for example a filling level. The filling level can, for example, be the distance of filling goods surface 105 from reference line 106 and can be supplied for further processing at output 213 of offset determination apparatus 107. To determine the distance, transmit signal 130 and in particular the time point or time of emission of transmit signal 130 can be used as a reference signal.

To determine the offset while transmitter 302 is deactivated, calculation of the arithmetic mean of a plurality of sampling values determined within quiescent range II takes place in offset provision device 208 for determining the offset.

Figure 3:
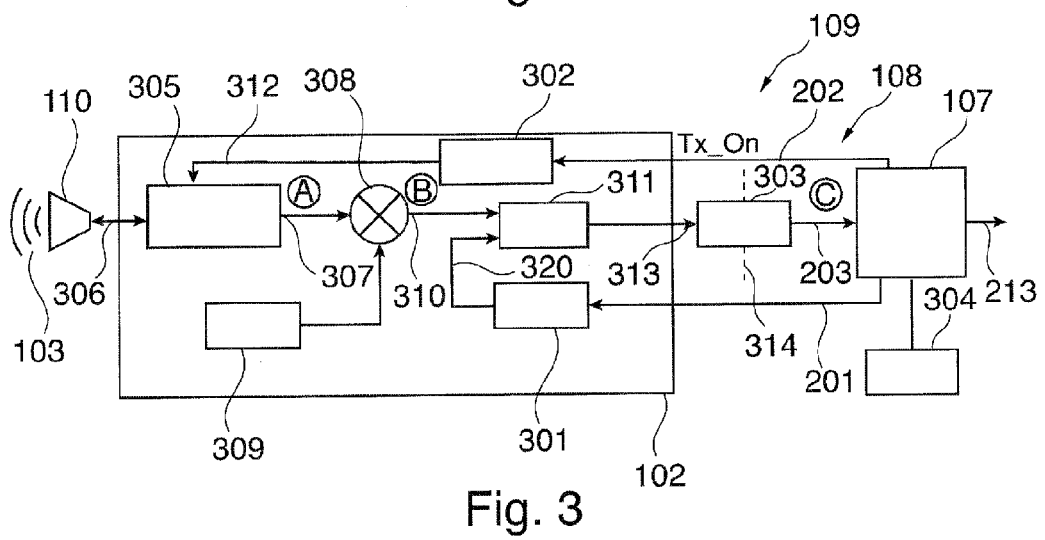
FIG. 3 shows a block diagram of a measuring apparatus comprising a transmit-receive device and an offset determination apparatus according to an exemplary embodiment of the present invention.

FIG. 3 shows a block diagram of a measuring device 109 comprising a transmit-receive device 102 and an offset determination apparatus 107 according to an exemplary embodiment of the present invention. Offset determination apparatus 107 is implemented in the example of FIG. 3 as microcontroller μC 107 on which a computer program product is executed. However, offset determination apparatus 107 can also be implemented as a hardware assembly, for example in the form of an FPGA (field programmable gate array) or as a combination of a microcontroller with a hardware assembly. Via interface 108, which has feedback connection 201 to actuating element 301 and control connection 202, via which control signal Tx_On is supplied to a transmitter 302, a connection can be established between the components offset determination apparatus 107 and transmit-receive device 102 of measuring system 109. Interface 108 also has input connection 203, via which the sampling values of reflection signal C determined by analog/digital converter 303 are exchanged, which values have been determined by transmit-receive device 102, in particular by a corresponding receiver part, and A/D converter 303. Offset determination apparatus 107 can have storage device 304 for storing the echo curve or the offset curve and in particular for storing determined offset values.

Offset determination apparatus 107 makes a determined measured value available for further processing via output 213 of offset determination apparatus 107.

The high-frequency (HF) transmit signals generated by transmitter 302 are forwarded via lead 312 to transmit-receive separator 305 and via its bidirectional input and output 306 to antenna 110 or to coupling device 110' (not illustrated in FIG. 3). Transmit signals 103 and 103' respectively are transmitted as illustrated in FIG. 1 and FIG. 1a by antenna 110 or coupling device 110' in the direction of the reflective surface or the plurality of reflecting surfaces. Also via antenna 110 or coupling device 110', a reflected signal is received and supplied via transmit-receive separator 305, which, for example, may be a circulator apparatus or a directional coupler, at output 307 of transmit-receive separator 305 as an analog echo curve A or as analog reflection signal A. Analog echo curve A is essentially periodic with a cycle duration t1 corresponding to the cycle duration with which transmit signal 103 is transmitted. Analog echo curve A is supplied to mixer 308, correlator 308 or sampler 308 where, with the help of a local oscillator (LO) 309, it is sampled in such a way that a time-expanded analog echo curve B is formed. The method of a sequential sampling can be used to generate time-expanded analog echo curve B. Analog and time-expanded echo curve B can be passed on to amplifier 311 via mixer output 310. Sampler 308, local oscillator 309 and amplifier 311 together form a core of the receiver device of transmit-receive device 102.

With the help of control signal Tx_On, transmitter 302 is driven or controlled via signal lead 202 such that emission of transmit signal 103 is prevented for a predefinable quiescent range. The result of this in receive curve A is that either periodic echo signals occur or a quiescent signal, which is typically sustained over a plurality of cycle durations t1, occurs corresponding to switching on and switching off of the transmit signal. Due to the time expansion in sampler 308, the result is a time-expanded periodic receive curve B in which, however, the quiescent signal, due now to the time expansion method, is only sustained for a fraction of the cycle duration of receive curve B. This means that a combined curve made up of the echo curve and the offset curve is provided via connection 313 at analog/digital converter 303 as the output of amplifier device 311. Analog/digital converter 303 may be regarded as a virtual boundary 314 between an analog side facing transmit-receive device 102 and a digital side facing offset determination apparatus 107. Analog/digital converter 303 samples the received time-expanded analog reflection curve, digitises it and makes a discretised receive curve C available via output lead 203 at offset determination apparatus 107. Input 203 of offset determination apparatus 107 thus obtains time-expanded sampling values of the reflection signal recorded by transmit-receive device 102.

Figure 4:
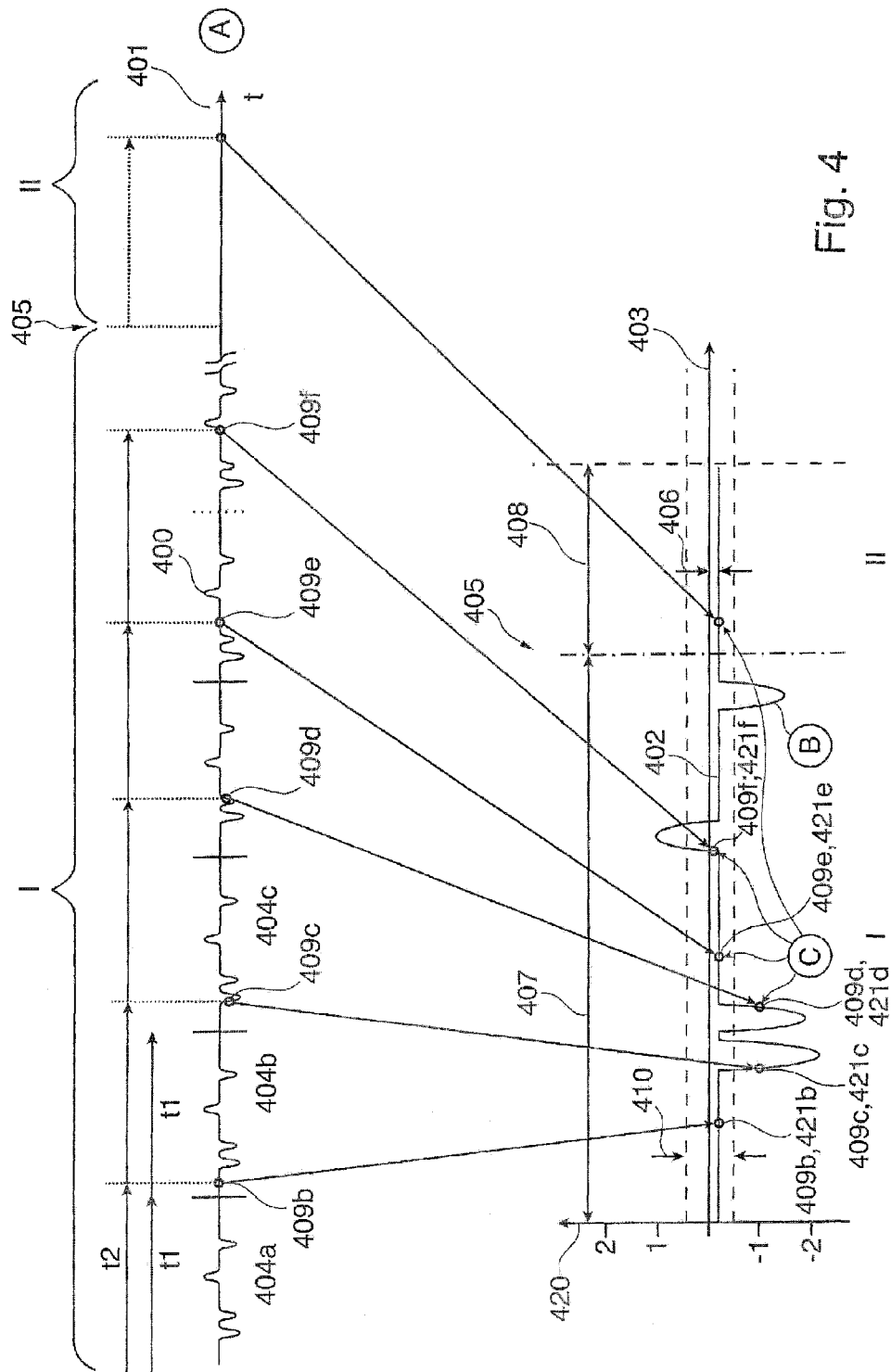
FIG. 4 shows a schematic representation of the generation of time-expanded sampling values of a reflection signal according to an embodiment of the present invention.

FIG. 4 shows, with the help of time charts, a schematic representation of the various steps of a method for generating time-expanded sampling values of reflection signal according to an embodiment of the present invention. It is illustrated how received reflection curve 400, A can be processed in such a way that it can be used to determine an offset value. As a result of the periodic emission of a pulse-shaped transmit signal 103, a corresponding periodic analog reflection signal A, 400 is generated. The periodicity of the signal occurs due to the linking together of a predefinable number of reflection signals 404a, 404b, 404c, which are received during an observation period I or measuring range I. First cycle duration t1 of transmit signal 103 consequently generates a periodic reflection signal with the first cycle duration t1. Analog reflection signal A, 400 is generated at the position that is indicated with A in FIG. 3 downstream of transmit-receive separator 305. Analog reflection signal A is plotted over timescale 401 as abscissa. Due to fluctuating or varying filling levels and other influences inside a tank 100, the shape of each echo signal 404a, 404b, 404c can be slightly different within each cycle t1. However, because of the short duration of a single cycle t1 compared to the duration of a change in filling level, at least over a certain longer time interval, reflection curve 400 represents an essentially constant echo signal such that it is possible to speak at least approximately of a periodic signal during interval I.

By means of mixer 308, which is operated using a local oscillator 309 with a second cycle duration t2 and which samples analog reflection signal 400 with this second cycle duration t2, exactly one sampling value 409b, 409c, 409d, 409e, 409f is generated per first cycle t1. Since in addition, second cycle duration t2 is greater than cycle duration t1, the sampling signal travels per first cycle along reflection curve 400. For reflection curve 404b there is sampling value 409b, for reflection curve 404c there is sampling value 409c, for reflection curve 404d there is sampling value 409d or generally for each reflection curve of the duration of first cycle t1 there is exactly one associated sampling value until sampling values 409b, 409c, 409d, 409e, 409f have been generated for a whole cycle t1. A time-expanded analog reflection curve 402, B or a time-expanded reflection signal 402, B is reconstructed from sampling values 409b, 409c, 409d, 409e, 409f which have a time interval of t2. For example, such an analog time-expanded reflection curve 402 may occur due to low-pass filtering after sampling. The reconstructed analog time-expanded reflection curve is available at the position indicated by the letter B in FIG. 3 downstream of correlator 308. Reflection curve 402, B is a time-expanded copy or representation of individual cycle durations t1 of measuring curve A 404a, 404b, 404c. Echo curve B, 402 is represented in FIG. 4 in a coordinate system which as abscissa 403 represents the time t in milliseconds or the distance in meters. Ordinate 420 records the amplitude values of reflection signal B, 402 in the unit volts, for example as electric voltage or electric field strength.

As analog echo curve A is a periodic signal with essentially cycle duration t1, and as curve B has been generated time-expanded from curve A, time-expanded analog representation B of echo signal A also has a periodic shape or progression. In other words, within the periodic shape of analog echo curve A, a measuring range I may be determinable which is characterised in that, during sampling with second cycle duration t2 within measuring range I of curve B, a waveform, a shape or progression of an individual curve 404a, 404b, 404c is essentially represented as time-expanded curve B. Due to the periodicity, measuring range I would periodically repeat itself if quiescent range II was not generated by means of control device 206. Echo curve B has a cycle duration that includes the duration or time interval of measuring range I and the duration or time interval of quiescent range II. FIG. 4 illustrates only a single cycle of periodic signal B, 402 as the signal is cyclically overwritten in order to enable a display on a screen, in order to enable storage in a storage device or in order to enable an evaluation.

Offset determination apparatus 107 allows that after the expiry of measuring range I or measuring interval I, that is to say after a predefinable number of first cycle durations t1, a switch-off signal will be generated at a time 405 to switch off transmitter 302 which transmits periodically. In time-expanded echo curve 402, boundary 405 is represented as transformed boundary 405'. As the switch-off takes place periodically in one example, the resulting signal which is made up of ranges I and II can also be referred to as a periodic signal. The number of periods after which transmitter 302 is switched off depends on the sampling range to be recorded or to be registered. The sampling range to be recorded depends on measuring range I and can relate, for example, to the height of the tank.

A quiescent range II during which essentially no reflection signal can be received is generated by interrupting transmitter 302. The time duration or the length of quiescent range II is determined such that during this time essentially all existing echoes have decayed. The duration of quiescent range II may be selected such that, for example, a range of 1 m is recorded. Thus the number of cycle durations each with duration t1 to be awaited for quiescent range II may be determined. When calculating cycle durations t1 to be awaited, quiescent range II can be selected as an even-numbered multiple of first cycle duration t1. Quiescent range II, which follows on from measuring range I, artificially interrupts what is actually periodic signal A. Signal A can therefore essentially only be considered as periodic in measuring range I. Nevertheless, sequential sampling is applied to entire signal A, that is to say to measuring range I and quiescent range II.

The signal values which are received within quiescent range II and which deviate from the normal value, originate essentially from interferences and define an offset 406 or an amplitude offset 406. Offset 406 has the effect of a deviation of the signal value of analog time-expanded curve B to a normal value, in particular also in quiescent range II. In the example of FIG. 4, the normal value is assumed as abscissa 403, normal value 403 or zero amplitude value 403. The combination signal which is made up of measuring range I and quiescent range II can in one example be considered as a signal having a periodic shape or a periodic progression since quiescent range II always interrupts the periodic signal at essentially the same time. The combination signal of echo curve 407 and offset curve 408 is also periodic. Quiescent range II should not cover the whole range that is not supposed to be used as a measuring range. With regard to energy consumption, attention should be paid that for quiescent range II only as much time as necessary is provided in order to have sufficient time for determining the offset value. Quiescent range II may be selected to be relatively short, e.g. corresponding to a distance of 1 m. Between quiescent range II and the beginning of a new measuring range I, a standby range III would emerge in which transmitter part 302 of a transmit-receive device 102, as well as the receiver part of a transmit-receive device, as well as A/D converter 303 could be deactivated to save energy. The time-expanded cycle duration corresponding to non-time-expanded cycle duration t1 would then be the duration of ranges I+II+III.

Echo curve 407 is recorded or registered within measuring range I, while offset curve 408 which essentially only represents the level or value of offset value 406 is recorded within quiescent range II. Time-expanded analog echo curve B is generated by mixer 308 from sampling values of curve A. During this conversion, the sampling values of curve A are converted back into an analog curve B by means of subsequent low-pass filtering. First analog/digital converter 303 determines time-expanded sampling values 421b, 421c, 421d, 421e, 421f of sampled curve C, where in FIG. 4, for the sake of simplicity, sampling values 421b, 421c, 421d, 421e, 421f are consistent with sampling values 409b, 409c, 409d, 409e, 409f. Thus in FIG. 4, duration t2 is assumed to be consistent with t3. In the event that t2 and t3 are not consistent, sampling values 421b, 421c, 421d, 421e, 421f of sampled time-expanded echo curve C are generated by sampling or digitising echo curve 407 and/or offset curve 408 with a third cycle duration t3. Thus sampling values 421b, 421c, 421d, 421e, 421f generated by the A/D converter form sampled time-expanded echo curve C with time-expanded sampling values 421b, 421c, 421d, 421e, 421f of the reflection signal which as interpolation points have a gap of t3. Discrete curve C of time-expanded sampling values 421b, 421c, 421d, 421e, 421f of reflection signal C can be supplied to offset determination apparatus 107 for further processing.

FIG. 4 also illustrates control range 410 by means of dashed lines running parallel to abscissa 403. Control range 410 describes a tolerance range for the offset. If the offset is within this tolerance, it can be assumed that essentially no limiting effects are acting on the echo curve. Limiting effects occur if the amplitude values of the echo curve intermittently depart from the voltage range within which certain hardware components have their specified working range. A/D converter 303 can, for example, generate valid digital values only for input signals within a certain input voltage range. If amplitude values of the echo curve are occasionally outside this voltage range, then a signal limitation, which falsifies the echo signal at this point, occurs for this time. Thus an offset shift of the echo curve which is too severe can easily lead to a signal limitation and must be avoided for this reason. If the determined offset were to be outside the control range, it would be necessary to take suitable action to correct this. This action might be an adjustment of hardware components, for example a change to the setting of actuating element 301 which can correct the offset via amplifier 311.

Analog time-expanded echo curve B and discrete time-expanded echo curve C also concern a periodic signal where, with the passage of time, a measuring range I or an echo curve 407 and a quiescent range II or an offset curve 408 are repeatedly strung together in alternate sequence. Boundaries 405', 405 between measuring range I and reflection range II can be varied at will by deactivation device 214. Offset determination apparatus 107 can, for example, identify the end of measuring range I in that a set tank height h is consistent with a corresponding transit time value or a distance value. The user can set boundary 405 between echo range I and quiescent range II by parameterisation, that is to say by setting of parameters, by means of a setting device. Measuring range I can be predefined during parameterisation. In another example, the boundaries can be determined by means of calculation using the tank height h entered in an offset determination apparatus 107. For example, this calculation can allow for boundary 405 being at a distance which corresponds to 1.5 times tank height h or which corresponds to the tank height plus 3 m.

With the proposed method, it may be possible at any time, for example by means of a deactivation device 214 or a control device 206, to determine the offset of the echo curve in the same sampling procedure as actual measuring signal 407, I, i.e. during the accumulated cycle duration arising from the cycle durations of echo curve I and quiescent curve II.

To determine the offset, transmitter 302 is deactivated after recording or capturing echo curve I and another short range II is recorded or captured for the offset determination. In one implementation of switching over the number of sampling values or the number of points can be recorded. Sampling of offset curve 408 can begin immediately after the number of points which corresponds to sampling range 407 has been recorded and transmitter 302 has been deactivated. At least a single sampling point of A/D converter 303 would be sufficient for determining the offset value. In order to make range II so as to still be sufficiently short, a plurality of points, for example up to 200, can also be recorded. These 200 sampling values of quiescent range II can correspond to approx. 1-2 m on a local scale in the time-expanded range. Since only the few sampling values recorded in this short range II have to be stored, compared to the storage of a complete curve, the storage requirement for offset determination may be only a fraction of the storage area which the complete curve would require.

Due to the possibility of being able to determine the reference signal for offset compensation at any time, for example by means of deactivation device 214, it is possible to prevent influences caused by possible changes or offset shifts of echo curve 402 and of the reference signal as a result of temperature, component ageing or other physical variables (EMC). Echo curve B 402 can also be described as an IF signal (intermediate frequency signal) because its frequency is lower than that of originally received HF signal 400.

It is possible to essentially exclude influences on range II, in which the offset correction value is determined, e.g. influences by means of multiple echoes in tall narrow tanks, by sampling the offset signal while the transmitter is deactivated. It can take a very long time for multiple echoes to tail off in narrow tanks. In such tanks, if the region at the end of the echo curve or at the beginning of the next echo curve were to be used for offset determination, it could be that this determination would be falsified by multiple echoes.

Moreover, the offset may be corrected by means of an actuating element 301 and/or a digital correction in offset correction device 209. Correction by means of actuating element 301 acts first on next sampled curve C which is why the momentary curve can still be "offset-afflicted". Thus the first correction first has an effect on echo curve C which is sampled next by A/D converter 303. Due to continuous determination of the offset value, it is also possible by means of software in processor 107 to correct the offset currently existing on the echo curve by means of a calculation rule or by digital signal processing, for example by adding or subtracting the offset value. This second correction can take place in offset correction device 209. Digital signal processing is possible as curve C is present as a curve of discrete values which are accessible to the digital processing system. Actuating element 301 provides for the first analog correction on the analog side and processor 107 provides for the second digital correction on the digital side of A/D converter 303. The calculation during digital signal processing may lead to delayed provision of the measurement result.

An echo curve is required for determination of the measured value. Recording or sampling of the echo curve 404a, 404b, 404c generated by transmit-receive device 102 is initiated by a microprocessor µC 107. Activation or control of transmit-receive device 102, A/D converter 303 or sampling device 303 and digital potentiometer 301 is carried out via this µC 107 for offset control.

µC 107 determines the number of sampling points recorded. If µC 107, in particular control device 206, has recorded the required distance, i.e. if the predefinable number of sampling points has been recorded, then transmitter 302 is deactivated by µC 107 and sampling of the offset signal begins immediately. Only a short range II of analog signal B is sampled for the digitisation of offset range II. In one example, 200 sampling values are generated. The number of sampling values to be stored is therefore lower than if the complete echo curve were to be stored over the measuring range, for example if a complete reference curve had to be stored. Compared to the sampling values arising during digitisation of an echo curve, only a small storage space or low-capacity storage module 304 is necessary for the 200 points or 200 sampling values of the example.

The offset size of the echo curve is determined from the sampling values of the offset curve by calculating the average, for example the arithmetic mean, inside offset determination apparatus 208.

Actuating element 301 with which the quiescent level of analog echo curve B can be influenced, can be implemented by means of a digital potentiometer. A correction value is passed onto amplifier 311 via lead 320. Amplifier 311 can be implemented as a differential amplifier. Actuating element 301 can also be implemented as a digital actuating element having a D/A converter (digital/analog converter). D/A converter 301 may generate the control voltage directly and requires no additional voltage divider. A further possibility of implementing actuating element 301 would be to generate a PWM signal (pulse-width modulated signal) which is transformed into a direct voltage with the help of an RC element. The direct voltage then serves as a control voltage.

If there is no need to control or regulate the quiescent level with the help of a digitally driven analog actuating element 301, then one might also use a voltage divider 301 or potentiometer 301 for trimming the module. However, in this case it would not be possible to react automatically to altered offset values. These actuating elements would have to be adjusted manually. As an alternative to partial digital control using the digital potentiometer, it is also possible to imagine a completely analog control system wherein an offset voltage measured in an analog way generates an analog control voltage via analog amplifiers and controllers.

For measuring the offset, transmit-receive device 102 is switched off, in particular a part 302 of transmit-receive device 102, which is responsible for generating transmit signal 103, while a part of transmit-receive device 102 which is responsible for receiving remains active. Send-receive device 102 can be switched off using transmitter 302. Various possible configurations are conceivable for switching off transmitter 302. Transmitter 302 has at least a clock oscillator 502 and a pulse generator 501.

Figure 5:
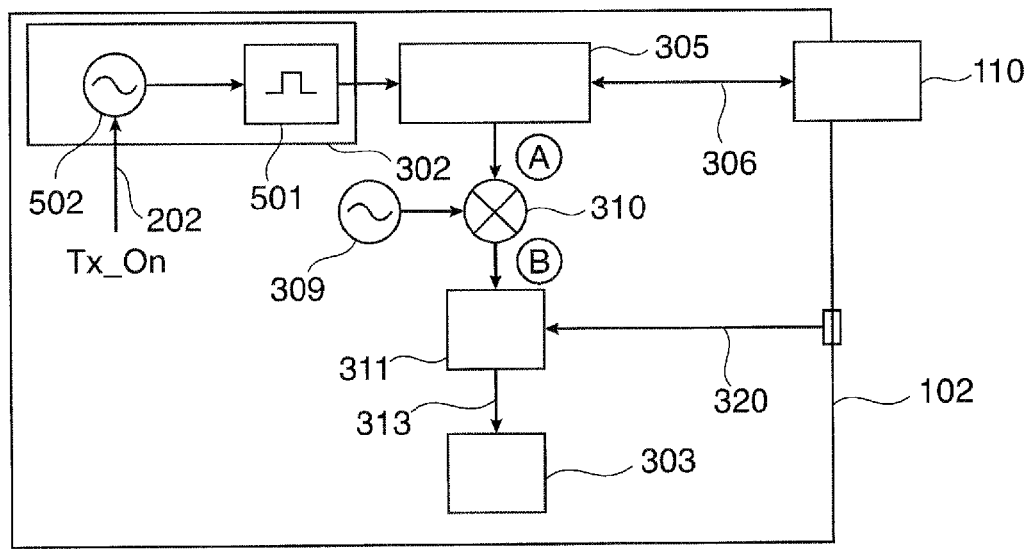
FIG. 5 shows a block diagram of a transmit-receive device, wherein the transmit-receive device can be switched off by deactivating an oscillator, according to an exemplary embodiment of the present invention.

FIG. 5 shows the switch-off of transmitter 302 by deactivating an oscillator 502 according to an exemplary embodiment of the present invention. To do this, oscillator 502, which generates the clock pulse with cycle duration t1 for transmit signal 103, is driven with control signal Tx_On. In this example, lead 202 is connected to oscillator 502 and the Tx_On signal switches oscillator 502 on or off.

Figure 6:
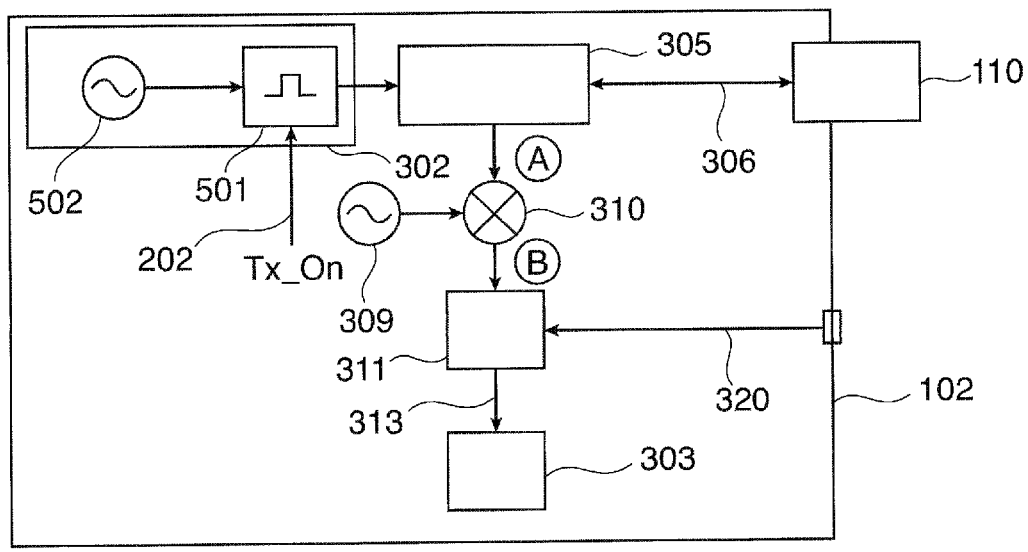
FIG. 6 shows a block diagram of a transmit-receive device, wherein the transmit-receive device can be switched off by deactivating a pulse generator, according to an exemplary embodiment of the present invention.

FIG. 6 shows the switch-off of transmitter 302 by deactivating pulse generator 501 according to an exemplary embodiment of the present invention. The signal generated by oscillator 502 is supplied to pulse generator 501 as clock before it is supplied for transmission to transmit-receive separator 305 of antenna 110. If pulse generator 501 is switched off, there will no longer be any transmit signal or transmit pulse generated.

Figure 7:
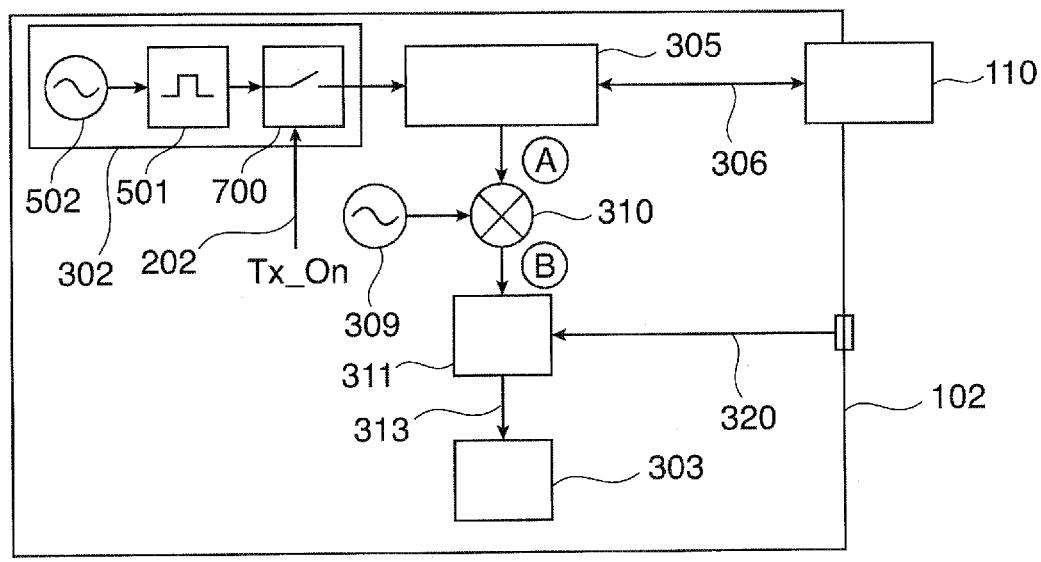
FIG. 7 shows a block diagram of a transmit-receive device, wherein the transmit-receive device can be switched off by means of an on/off switching device, according to an exemplary embodiment of the present invention.

FIG. 7 shows the switch-off of transmitter 302 by means of an on/off switching device 700 according to an exemplary embodiment of the present invention. Transmitter 302 has an on/off switching device 700 between pulse generator 501 and transmit-receive separator 305. On/off switching device 700 is inserted in the signal path of the transmit pulse. On/off switching device 700 or switch 700 is driven or activated by control signal Tx_On via lead 202 and is switched on or switched off. With this arrangement, transmitter 302 can be deactivated in that switch 700 opens or breaks the connection between pulse generator 501 and transmit-receive separator 305. Transmitter 302 is activated when switch 700 is closed.

It should be noted that the part of transmit-receive device 102 responsible for transmitting can be switched off independently of the part of transmit-receive device 102 responsible for receiving a signal.

In FIGS. 5, 6 and 7, transmit-receive device 102 includes A/D converter 303, while in FIG. 3 A/D converter 303 is outside the transmit-receive device. A/D converter 303 can thus be integrated in transmit-receive device 102 or can be arranged externally to transmit-receive device 102.

Figure 8:
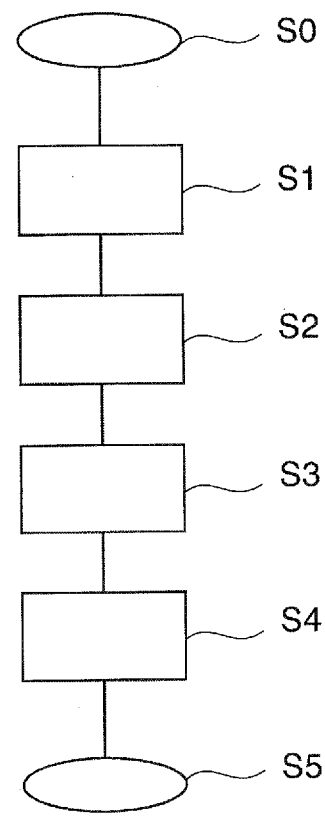
FIG. 8 shows a flow chart for a method for determining an offset according to an exemplary embodiment of the present invention.

FIG. 8 shows a flow diagram for the offset correction sequence. FIG. 8 therefore shows a flow diagram for a method for determining an offset according to an embodiment of the present invention. The method begins in step S0 and in step S1 time-expanded sampling values of a reflection signal of a transmit signal are received, which signal, prior to being received, has been transmitted by transmit-receive device 102 with a first cycle duration t1.

An end of measuring range I of echo curve 407 is identified in step S2. Outside measuring range I of time-expanded sampling values 407, i.e. after the number of sampling values envisaged for measuring range I has been recorded, switch-off signal Tx_On is supplied to transmit-receive device 102, which signal can at least intermittently deactivate the transmission of transmit signal 103 in order to generate a predefinable quiescent range II within the time-expanded sampling values of reflection signal 402. The duration of the provision of switch-off signal Tx_On can be predefined or can be variably adjusted by means of control device 206 for the duration of the switch-off signal The duration of the switch-off may be long enough to ensure that the duration of quiescent range II lasts long enough to sample a sufficient number of sampling values. That is to say, if a lower sampling rate 1/t3 of D/A converter 303 is used, quiescent range II will be longer than if a high sampling rate is used so that the same number of sampling values can be read in.

In other words, with activated transmitter 302 with the help of A/D converter 303, analog echo curve B is digitised and converted into a corresponding digital representation C.

If μC 107 has recorded the required distance of measuring range I, then μC 107 will deactivate transmitter 302 and sampling of offset signal 408 will begin immediately. The required distance of measuring range I will be specified, for example, based on the number of sampling points. For sampling of offset signal 408, only a short range II of the analog signal will be sampled, for example 200 sampling values.

In step S3, the value of an offset 406 within quiescent range II is determined as a deviation from normal value 403. For this offset determination, the size of the offset of the entire echo curve, which is made up of echo curve 407 and offset curve 408, is determined, e.g. from the sampling values of offset curve 408 by determining the arithmetic mean of a subgroup of sampling values from quiescent range II or from all the sampling values. For correcting the offset of the entire echo curve, it is assumed that the same offset that was determined for offset curve 408 was or is also effective for echo curve 407.

In step S4, the offset value, a characteristic quantity derived from the offset value or a signal derived therefrom is supplied before the method has reached final state S5.

Figure 9:
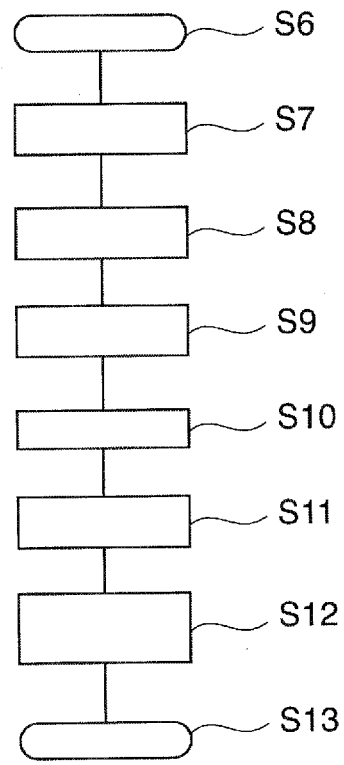
FIG. 9 shows a further flow chart of a method for determining an offset according to an embodiment of the present invention.

FIG. 9 shows a further flow chart of a method for determining an offset according to an embodiment of the present invention.

This further method begins with step S6 which represents an initial state. The echo curve which will be used to determine the measured value, for example the filling level, is generated in step S7. To generate the echo curve, a pulsed transmit signal 103, 103' is transmitted by antenna 110 or coupling device 110' and echo curve A generated therefrom is recorded using transmit-receive separator 305. Sampling is initiated by sampling control device 206 in offset determination apparatus 107 which can be implemented as processor 107 or microcontroller 107. Sampling control device 206 or control device 206 in offset determination apparatus 107 also drives sampling device 303 which can be implemented as A/D converter 303. By means of connecting lead 201, offset provision device 208 controls actuating element 301, for example a digital potentiometer, and thus enables the implementation of an offset control.

A time-expanded signal B is formed from echo curve A with active transmitter 102 or active transmit-receive device 102 with the help of mixer 308. Time-expanded signal B or echo curve B is then transformed by means of A/D converter 303 into a digital representation C, i.e. into time-expanded sampling values 421b, 421c, 421d, 421e or digital echo curve C.

In step S8, offset determination apparatus 107 ascertains whether the required distance of measuring range I has been recorded. Consequently, it is ascertained whether a predefinable number of sampling points 421b, 421c, 421d, which adequately describe digital echo curve C within measuring range I, have been recorded by offset determination apparatus 107. If it is ascertained that entire measuring range I of interest, i.e. a complete echo curve 407 or a full echo curve 407, has been recorded, then in step S8 transmitter 302 will be deactivated by switch-off signal Tx_On in lead 202. The consequence of deactivation is that the transmit signal otherwise transmitted with first cycle duration t1 is no longer sent wherein, however, the receiver part of transmit-receive device 102 remains switched on with the result that, after a measuring range I, quiescent range II forms at switch-off point in time 405. Only signals which are not attributable to the transmission of a transmit signal 103 are received in this quiescent range II. As transmitter 302 of transmit-receive device 102 is switched off, but the receiver part of transmit-receive device 102 is active despite the switch-off of transmitter 302, in quiescent range II only the effect of disturbance variables or interference on the receiver part of transmit-receive device 102 is recorded.

In step S9, sampling of offset curve 408, that is to say the evaluation of sampling values within quiescent range II, can begin immediately following switch-off point in time 405 which transforms to boundary 405' between echo curve 407 and offset curve 408. Thus the offset signal or offset curve 408 is essentially sampled immediately after measuring range I. Offset determination apparatus 107 comprises deactivation device 214 with which an immediate stop of transmit signal 103, 103' can be achieved. Boundary 405, 405' can be shifted by applying deactivation device 214.

Only a short range 408 of echo curve 402 is sampled for determination of the offset value. This short range 408 or offset curve 408, in particular the signal values of analog echo curve B which fall in quiescent range II, are sampled with relatively few sampling values. Therefore quiescent range II or the part of quiescent range II which is used for determination of the offset can turn out to be relatively small. In the range which is used for the evaluation, by switching off the transmit signal it is possible to reduce the existing signals to essentially the signals which are responsible for interfering with correct receiving of the echo curve. Consequently, for determining the offset value it is not necessary to save or to store a complete reference curve of the echo signal, for example an entire echo curve of measuring range 407, for an empty tank. Sampling with relatively few sampling steps is sufficient. For example, it is sufficient to save 200 sampling values in order to determine the offset value. Consequently, a memory 304 of offset determination apparatus 107 may turn out to be small.

The size of the average offset of the echo curve can be determined by determining or calculating the arithmetic mean from the sampling values of discrete echo curve C which fall in quiescent range II, that is to say from the sampling values of offset curve 408. This offset value can be used in different ways for correction of the echo curve. Calculation of the offset by means of averaging is performed in step S10.

In step S11, the correction value determined from the calculated offset value can be outputted, for example via output 210a of offset provision device 208.

In step S12, the determined correction value or the offset value can be used to correct echo curve C by the value of the offset. This correction of the echo curve by the offset can take place on the analog side of measuring device 109 and/or on the digital side of measuring device 109, i.e. prior to analog conversion by means of A/D converter 303 and/or thereafter.

Feedback lead 201 together with actuating element 301 and feedback lead 320, which is introduced at a second output or at a second input of amplifier 311, can implement a closed-loop offset control, an open-loop offset control or an offset control loop. The quiescent level of analog echo curve B is shifted via actuating element 301 of this offset control, as a result of which sampled echo curve C is also shifted. For determination of the measured value, the quiescent level should essentially correspond to the normal value since in this case the detection curve or threshold value curve can be placed very close to the echo curve. Analog echo curve B can be shifted as close as possible to normal value 403 or zero amplitude value 403 by means of actuating element 301. By approximating echo curve B to normal value curve 403, it is possible at the output of amplifier 311 to supply analog echo curve B for which no offset correction or only a small offset correction is necessary on the digital side. Furthermore, it is possible by means of actuating element 301 to prevent echo curve B from departing too far from its desired quiescent level, as a result of which limiting effects can occur which could lead to measuring errors. If analog curve B departed too far from the desired quiescent level, i.e. from normal value 403, echo curve B could be pushed out of a permissible input recording range for amplitude values of the analog/digital converter and be cut off as a result. Cutting off, trimming, capping or limiting of echo curve B would generate "rectangular" echo progressions and it would no longer be possible to exactly determine the maximum of an echo. Offset correction can prevent the range from being exceeded.

The echo curve which was determined in the same sampling procedure as the offset value can still, however, contain a small offset and therefore can still be shifted. In other words, despite correction of the offset on the analog side, an offset shift may still be present since the determination of an offset can only have an effect on subsequent signals. The echo curve, which was determined in the same sampling procedure as the offset value, was recorded chronologically prior to determination of the offset value and is therefore not yet affected by the feedback of the offset correction value via the actuating element.

The following facts are to be understood by the term "same sampling procedure". If one considers the time-expanded echo signals B and C as periodic signals, each of which having a measuring range I and a quiescent range II as a combined cycle duration, the term "same sampling procedure" means that all sampling values lie within the same combined cycle duration of ranges I and II. Thus time-expanded echo curve 402 of FIG. 4 shows an entire echo curve with the cycle duration made up of the cycle duration of echo curve 407 and the cycle duration of offset curve 408 from the same sampling procedure in which an offset value is also determined. Echo curve 402, in particular offset curve 408, which was used for determining the offset still contains the offset. Although this is corrected by hardware for the subsequent curves, so that the current curve is also virtually offset-free, it still has to be corrected computationally.

The method finally ends in step S13.

The method described makes it possible for the offset value which has been determined in the previous step to be used in order to correct the current curve. The determination of an offset value only has an effect on the next time-expanded echo curve on the analog side. A digital echo curve located in a memory can be corrected by means of an offset value determined afterwards before the measured value is supplied. A digital echo curve located in a memory can be corrected by means of an offset value determined after storing the digital echo curve in the memory and before the measured value is supplied. By subtracting or adding the offset value according to its sign from echo curve C, 421b, 421c, 421d, 421e, an echo curve which is essentially offset-free can be supplied downstream of offset correction device 209, that is to say after correction of the offset. By the parallel application of an analog offset correction and a digital offset correction, it is therefore possible to supply averaging device 211 and measured value determination device 212 with a virtually offset-free echo curve for measured value determination. The echo curve which can be made available to averaging device 211 or the average device 211 can, because it is essentially offset-free, lie very close to the detection curve and therefore even such echoes which, when using an offset-afflicted echo curve, would no longer be visible or detectable, can be determined by measured value determination apparatus 212.

Due to the possibility of being able to subsequently correct already sampled echo curves C digitally or computationally, i.e. processing them with the help of a microprocessor 107, it is therefore also possible to prevent actuating element 301 of the offset control from having to have a very high resolution. In other words, this means that the analog correction of the offset can only be carried out with the accuracy or resolution of actuating element 301, for example the resolution of the digital potentiometer. Only if the offset corresponds exactly to this resolution or a multiple thereof, can the offset be thus fully corrected or removed. In all other cases, after correction via actuating element 301, a residual offset remains present which can only be corrected or removed computationally. The residual offset, however, can in any case be assessed as so small that it lies within control range 410 and therefore there is no fear of limiting effects.

Feedback 201 of the offset value can therefore manage or get along with a low resolution. If it were not possible to avoid this very high resolution of actuating element 301, the resolution of the actuating element would have to be at least half an LSB (least significant bit) of the A/D converter so that an offset would no longer be determinable on the echo curve.

The method described and the apparatus described can prevent limitations in relation to a solution which uses two echo curves. On the one hand, a solution with two echo curves, which determines each offset in a range of the echo curve before of a reference pulse and takes the offsets of both curves into consideration when comparing the two echo curves, can lead to a situation that ranges before the reference pulses in which the offset is determined may contain echoes. These echoes can falsify the offset determination. On the other hand, in the solution that uses two echo curves, the effect can also be that individual echo curves are always afflicted with offset which can lead to a limitation of the echo curve signal. The offset is only removed during the comparison of different echo curves.

The method described determines and essentially completely eliminates the offset of each individual echo curve individually and to do this essentially uses the steps described below.

First of all, a range II of the echo curve is generated, said range being suitable for determining the offset in that the transmit pulse is intermittently or temporarily deactivated with a signal "TX_On". After deactivation of the transmit pulse, the offset is determined within above-mentioned range II, 408. For extensive elimination of the offset, control takes place via an actuating element 301. In one example, the effect of the control is chronologically shifted due to the feedback. The control only acts, e.g. on the next "shot". Thus the control acts first on a second echo curve 407, which chronologically follows a first echo curve 407, wherein the offset correction of the second echo curve is derived from the first echo curve. It may also happen that a small offset remains once a rough elimination of the offset has taken place before of the A/D conversion to prevent limitation. The offset that is still left over after the A/D conversion is eliminated completely in the next step. This elimination can be carried out computationally, for example by subtraction of a constant offset value from all the discrete points of the echo curve.

As a result of correcting the offset, when transmit-receive device 102 is switched off, an echo curve is provided which, in the essentially total absence of all receive signals, remains on expected quiescent value 403, normal value 403 or zero value 403 over the time curve. The quiescent value is represented in the resulting echo curve, that is to say in the echo curve which after correction of the offset is transferred to averaging device 211 and which is used for further signal processing, by a known amplitude value for the absence of all signals. A known amplitude value may e.g. be the value zero.

By offset correction, every single echo curve downstream of offset correction device 209 is essentially offset-free, as a result of which reflections or echoes can easily be identified even without comparison to a reference curve. Due to time interval II, which is long compared to the decay duration of echoes in the tank, during which time interval the offset is determined, determination of the offset cannot essentially be disrupted by echoes. Limiting effects which arise, for example, due to offsets can be prevented. Furthermore, multi-stage offset elimination, for example a division into rough offset elimination and precision offset elimination, can be carried out. Multi-stage offset elimination can provide for a combination of analog offset control and computational offset correction. This combination can lead to cost benefits and reduce the expense for the implementation of good offset correction, for example because components with low resolutions can be used.

By means of deactivation device 214, it is immediately possible, that is to say directly after operation of the deactivation device, to generate the receive quiescent value or offset curve 408 at any points in time and time intervals within the echo curve by deactivating the transmit signal Switching off the transmit signal and generating a corresponding quiescent range in the time-expanded range can also be used for further applications. In addition to the offset elimination described above, interfering echoes or spurious echoes can be masked out, the reference level can be used for determination of the echo amplitudes and the noise level of the intrinsic noise of the receiver or the internal noise of the receiver can be determined.

It may be a further aspect of the invention that a transmitter is deactivated in order to obtain a section with quiescent levels at any points in time within an echo curve. As a result of this, it is possible to avoid having to switch off the receiver and to prevent internal deficiencies of the receiver from generating offset and noise themselves. The quiescent values obtained can be compared to the known desired quiescent values and, from the results of the comparison, it is then possible to calculate the offset present due to the internal deficiencies in the receive signal. By eliminating the offset, it is possible to prevent the internal deficiencies from leading to the echo curve signal not being identical to the desired quiescent level when the transmitter is deactivated. The desired quiescent level corresponds in this case to the expected value in the absence of all reflections, that is for a predefined boundary condition.

With a pulse/transit time measurement without time expansion due to "sequential sampling", deactivation of the transmit signal would only lead to the quiescent level if all the reflections of the last transmission pulse, which were still "on the way" on switching off or were still being propagated, have decayed. Compared to cycle duration t1 of a single reflection signal 404a, 404b, 404c, this decay can last for many times this cycle duration t1. Expressed as a distance value, the decay can be many meters long.

The combination of switching off the transmitter and using a time expansion method by means of cross-correlation or by sequential sampling permits the deactivation of the transmit signal to affect the time-expanded echo curve virtually immediately, accelerated by the time expansion factor. With normal time expansion factors of several tens of thousands, many meters thus become for example just a few millimeters. If, in an example, the tank height h is 20 m, only after 100 m in a non-time-expanded scale have the reflections decayed enough to guarantee satisfactory measurement of the quiescent level. Therefore the "decay range" is 80 m. For a pulse/transit time method which uses no time expansion, it would be necessary in this example to wait up to 100 m in every transmit/receive cycle before the offset determination can take place. When using a pulse/transit time method with the time expansion technique combined with switching off the transmitter device essentially immediately after tank height h has been reached, the decay range decreases by the exemplary time expansion factor 100,000 from 80 m to 0.8 mm. After deactivation of the transmitter, it is therefore only necessary to wait 0.8 mm until a reliable measurement of the quiescent level is possible. In time-expanded echo curve 402, for example 1 ms transit time in time diagram 403 of the echo curve corresponds to approximately 1 m distance for round-trip propagation or back and forth propagation in a local scale. In non-time-expanded received echo curve 400, which is also referred to as an HF curve, the transit time of 1 ms corresponds to a distance covered of approximately 16,300 m for round-trip propagation or for back and forth propagation. In other words, this may mean that, if the decay of reflections after switching off lasts 1 ms, in the non-time-expanded diagram it corresponds to a value of 16,300 m and in the time-expanded diagram only 1 m.

The present invention can be employed with all pulse/transit time methods which use the sequential sampling time-expansion technique.

It should be pointed out by way of supplement that "comprising" and "having" do not exclude any other elements or steps and "one" or "a" does not exclude a plurality. It should further be pointed out that features or steps which have been described with reference to one of the above embodiments can also be used in combination with other features or steps of other embodiments described above. Reference numerals in the claims are not to be considered as restrictive.

What is claimed:

1. A measuring apparatus, comprising:
   a transmit-receive device;
   an offset determination apparatus determining an amplitude offset and including:
      a sampling receiver device receiving time-expanded sampling values of a reflection signal of a transmit signal that is sent with a first cycle duration by a transmitter device;
      a control device controlling the transmitter device; and
      an offset provision device;
   wherein the control device is adapted, outside a predefinable measuring range of the time-expanded sampling values of a reflection signal, to provide a switch-off signal which can deactivate the transmitter device at least intermittently in order to generate a predefinable quiescent range within the time-expanded sampling values of the reflection signal;
   wherein the offset provision device is adapted, by evaluating at least one sampling value of the time-expanded sampling values, which value is determined within the quiescent range, to determine a value of an amplitude offset of the time-expanded sampling values of the reflection signal from a normal value and to supply this value of the amplitude offset at an output of the offset provision device; and
   wherein the control device of the offset determination apparatus is connected to the transmit-receive device.

2. The measuring apparatus according to claim 1, wherein the time interval of the time-expanded sampling values of the reflection signal is a second cycle duration and wherein the second cycle duration is greater than the first cycle duration.

3. The measuring apparatus according to claim 1, wherein the duration of the switch-off signal corresponds to an integer multiple of the first cycle duration.

4. The measuring apparatus according to claim 1, wherein the predefinable measuring range depends on a tank height.

5. The measuring apparatus according to claim 1, wherein the value of the amplitude offset of the time-expanded sampling values of the reflection signal from the normal value is calculated by averaging a plurality of sampling values determined within the quiescent range in the offset provision device.

6. The measuring apparatus according to claim 1, wherein the offset determination device further comprising:
   a selector device;
   wherein the selector device is adapted to supply a time-expanded sampling value, which occurs within the measuring range, at a first output of the selector device and to supply at least one sampling value which is determined within the quiescent range via a second output of the selector device to the offset provision device.

7. The measuring apparatus according to claim 1, wherein the offset provision device is adapted to use the value of the deviation of the time-expanded sampling values of the reflection signal from a normal value for an amplitude offset correction of the reflection signal prior to a digitisation of the reflection signal and/or to use it for an amplitude offset correction of the reflection signal after a digitisation of the reflection signal.

8. The measuring apparatus according to claim 1, wherein the offset determination device further comprising:
   an offset correction device;
   wherein the offset correction device is adapted to provide the time-expanded sampling values of the reflection signal corrected by the value of the deviation.

9. The measuring apparatus according to claim 1, wherein the offset determination device further comprising:
   a deactivation device;
   wherein the deactivation device is adapted to transmit the switch-off signal at any point in time.

10. The measuring apparatus according to claim 1, wherein the time-expanded sampling values of the reflection signal are generated by sequential sampling and/or by digitising.

11. The measuring apparatus according to claim 1, wherein the offset determination device further comprising:
    a deactivation device;
    wherein the deactivation device is adapted to transmit the switch-off signal at any point in time even within the measuring range.

12. The measuring apparatus according to claim 1, wherein the measuring device is at least a measuring apparatus selected from the group consisting of a level measuring instrument, a limit level measuring instrument, a time domain reflectometer and a reflection measuring instrument.

13. A method for determining a deviation of a sampling value from a normal value, comprising:
    receiving of time-expanded sampling values of a reflection signal of a transmit signal that is periodically sent with a first cycle duration by a transmitter device;
    providing of a switch-off signal outside a predefinable measuring range of the time-expanded sampling values of a reflection signal which can deactivate emission of the transmit signal at least intermittently in order to generate a predefinable quiescent range between the time-expanded sampling values of the reflection signal;

determining of a value of an amplitude offset of the time-expanded sampling values of the reflection signal from a normal value by evaluating at least one sampling value of the time-expanded sampling values, which sampling value is determined within the quiescent range; and providing of the value of the amplitude offset.

14. A computer-readable storage medium on which a program code is stored which, if it is executed on a processor, instructs the processor to execute the following method:

receiving of time-expanded sampling values of a reflection signal of a transmit signal that is periodically sent with a first cycle duration by a transmitter device;

providing of a switch-off signal outside a predefinable measuring range of the time-expanded sampling values of a reflection signal which can deactivate emission of the transmit signal at least intermittently in order to generate a predefinable quiescent range between the time-expanded sampling values of the reflection signal;

determining of a value of an amplitude offset of the time-expanded sampling values of the reflection signal from a normal value by evaluating at least one sampling value of the time-expanded sampling values, which sampling value is determined within the quiescent range;

providing of the value of the amplitude offset.

15. A computer program product embodied on a non-transitory computer-readable medium which, if it is executed on a processor, instructs the processor to execute the following method:

receiving of time-expanded sampling values of a reflection signal of a transmit signal that is periodically sent with a first cycle duration by a transmitter device;

providing of a switch-off signal outside a predefinable measuring range of the time-expanded sampling values of a reflection signal which can deactivate emission of the transmit signal at least intermittently in order to generate a predefinable quiescent range between the time-expanded sampling values of the reflection signal;

determining of a value of an amplitude offset of the time-expanded sampling values of the reflection signal from a normal value by evaluating at least one sampling value of the time-expanded sampling values, which sampling value is determined within the quiescent range;

providing of the value of the amplitude offset.

* * * * *